(12) United States Patent
Haney et al.

(10) Patent No.: US 11,828,600 B2
(45) Date of Patent: Nov. 28, 2023

(54) INDOOR WAYFINDER INTERFACE AND SERVICE

(71) Applicant: NCR Corporation, Atlanta, GA (US)

(72) Inventors: John Edward Haney, Rosemount, MN (US); Ryan Scott Elliott, Acworth, GA (US); Kip Oliver Morgan, Atlanta, GA (US); Kelli Lee, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 156 days.

(21) Appl. No.: 17/489,635

(22) Filed: Sep. 29, 2021

(65) Prior Publication Data

US 2023/0096104 A1   Mar. 30, 2023

(51) Int. Cl.
*G01C 21/20* (2006.01)
*G06F 3/01* (2006.01)
*G06T 19/00* (2011.01)
*G06Q 30/0601* (2023.01)

(52) U.S. Cl.
CPC ............ *G01C 21/206* (2013.01); *G06F 3/011* (2013.01); *G06F 3/016* (2013.01); *G06Q 30/0639* (2013.01); *G06Q 30/0643* (2013.01); *G06T 19/003* (2013.01); *G06T 19/006* (2013.01)

(58) Field of Classification Search
CPC ....... G01C 21/206; G06F 3/011; G06F 3/016; G06Q 30/0639; G06Q 30/0643; G06T 19/003; G06T 19/006
USPC .......................................................... 701/41
See application file for complete search history.

(56) References Cited

U.S. PATENT DOCUMENTS

| 10,304,238 | B2 * | 5/2019 | Cooper | G06F 16/5866 |
|---|---|---|---|---|
| 11,450,024 | B2 * | 9/2022 | Gorodetsky | G06T 7/13 |
| 2016/0018648 | A1 * | 1/2016 | Osterhout | G06V 20/20 |
| | | | | 348/164 |
| 2016/0061613 | A1 * | 3/2016 | Jung | G01C 21/3632 |
| | | | | 701/538 |
| 2017/0116783 | A1 * | 4/2017 | Huang | G06T 7/73 |
| 2018/0218441 | A1 * | 8/2018 | Kumar | G06Q 30/0639 |
| 2019/0128676 | A1 * | 5/2019 | Naik | G01C 21/206 |
| 2019/0212158 | A1 * | 7/2019 | Gordon | G01C 21/3415 |
| 2019/0294841 | A1 * | 9/2019 | Hall | G06Q 50/28 |
| 2020/0184542 | A1 * | 6/2020 | Welty | G06Q 30/0637 |
| 2020/0208997 | A1 * | 7/2020 | Koh | G01C 21/3691 |
| 2020/0370889 | A1 * | 11/2020 | Eitel | G01C 21/08 |
| 2020/0382919 | A1 * | 12/2020 | Huang | G01S 5/01 |

(Continued)

FOREIGN PATENT DOCUMENTS

CN   113074736 A   *   7/2021

*Primary Examiner* — B M M Hannan
(74) *Attorney, Agent, or Firm* — Schwegman Lundberg & Woessner, P.A.

(57) ABSTRACT

An Augmented Reality (AR) wayfinder tracks the current location of a user within an indoor location relative to a path defined through the indoor location for the user. The path is broken into segments, each segment is a straight line between two nodes, and each node represents either a starting point in the path, a turn along the path, or an ending point in the path. As the user traverses the path, a remaining distance between the user device and the next node in the path is calculated. An AR object with attributes that correlate to the remaining distance to the next node is blended into and superimposed into a video that the user is viewing through the user device of the physical environment as the user travels along the path.

20 Claims, 3 Drawing Sheets

(56) References Cited

U.S. PATENT DOCUMENTS

| | | | | |
|---|---|---|---|---|
| 2020/0387154 | A1* | 12/2020 | Sellner | B66F 9/07581 |
| 2021/0027523 | A1* | 1/2021 | Ichikawa | G06F 3/011 |
| 2021/0031364 | A1* | 2/2021 | Groz | B25J 9/1689 |
| 2021/0374836 | A1* | 12/2021 | Bronicki | G06Q 10/0639 |
| 2022/0374941 | A1* | 11/2022 | Sakuma | G06Q 30/02 |
| 2023/0162461 | A1* | 5/2023 | Knaani | G06T 19/20 |
| | | | | 345/419 |

* cited by examiner

INDOOR WAYFINDER INTERFACE AND SERVICE

BACKGROUND

Tracking locations of people indoors can be achieved in a variety of different manners from what is used for tracking locations of people outdoors. For example, Bluetooth® beacons in combination with a user device can be used as an inexpensive technique indoor location tracker. Overhead cameras and lighting systems may also be used to provide better accuracy than beacon-based approaches.

Whichever approach is used for tracking indoor locations, providing route guidance indoors prevents a number of different issues that are different from conventional driving route guidance.

For example, route guidance and wayfinders (associated with providing signs, landmarks, road labels, and other cues during route guidance) are not geared towards providing indoor guidance. Frequently, indoor structures and indoor layouts change, such that a mere modified version of existing wayfinders would be impractical and frequently out-of-date.

Furthermore and equally important to indoor route guidance, people do not usually associate walking distances in the same manner they associate driving distances, so showing a person directions with distances is not as helpful as would be showing a person where to turn during indoor routing guidance. A wayfinder does not have to be as exact for indoor route guidance as they need to be for driving route guidance; sometimes merely knowing where to turn when navigating indoors is just as useful as being on top of it, and in some instances, people just prefer being pointed in the right direction with indoor route guidance.

Thus, there is a need for an efficient indoor route guidance wayfinder that is accurate, cost efficient, easy to integrate at any given indoor location, and reflects the manner in which people naturally navigate themselves within unfamiliar indoor settings.

SUMMARY

In various embodiments, a system and methods for an indoor wayfinder interface and service are provided.

According to an embodiment, a method for indoor wayfinding is presented. A path for a user to traverse through an indoor location is obtained and an Augmented Reality (AR) waypoint session is established with the user who is operating a user device that streams a video of a physical environment for the indoor location as the user traverses the path. An AR object with attributes that correlate to a remaining distance between the user device and an upcoming node in the path is maintained. The AR object is provided to the user device to superimpose within the video being viewed by the user of the physical environment on the user device as the user traverses to the upcoming node. A next upcoming node of the path is obtained, and the AR object and attributes are updated and provided to the user device, this iterates until a final node of the path is reached by the user.

DETAILED DESCRIPTION

Figure 1:
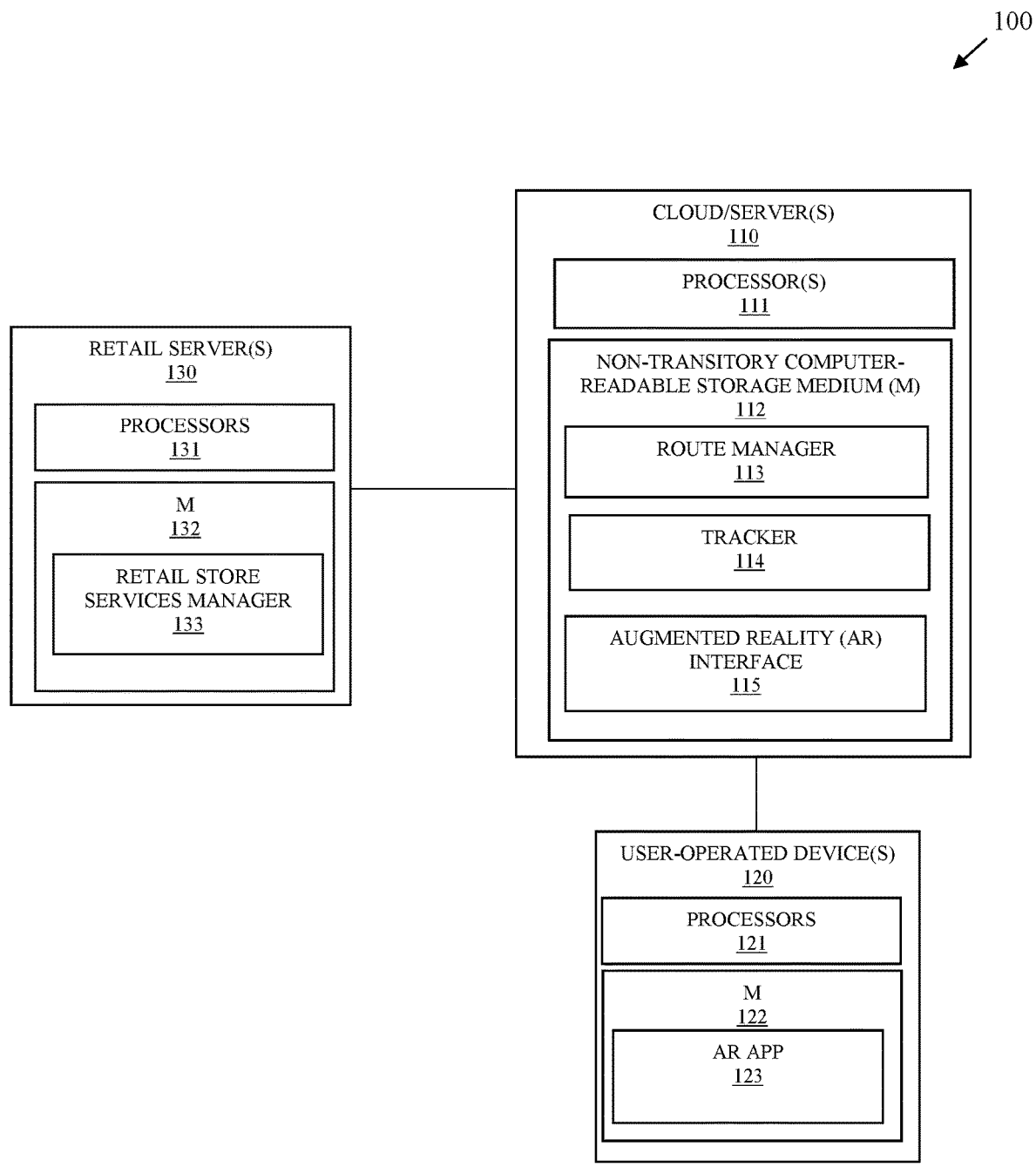
FIG. 1 is a diagram of a system for an indoor wayfinding interface and service, according to an example embodiment.

FIG. 1 is a diagram of a system/platform 100 for indoor route mapping, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of providing indoor wayfinding, presented herein and below.

System/platform 100 (herein after just "system 100") provides a processing environment by which a customer is provided an Augmented Reality (AR) based wayfinding interface and service for navigating a route within a given indoor location. The customer operates a customer device having an integrated camera that provides a video of a physical environment in real time on the customer device as the customer travels a provided route to one or more desired destinations of the customer along the route. The interface superimposes a variety of visual cues onto the video stream being viewed by the customer. The visual cues dynamically change size, shape, and/or color as the customer is nearing a turn in the route or nearing a desired destination along the route, which provides the customer with useful and intuitive wayfinding guidance as the customer travels the route to one or more desired destinations along the route. Additionally, when the customer is within a preconfigured distance of a turn along the route or within the preconfigured distance of a desired destination along the route haptic based feedback is provided through the interface for processing on the customer device to further alert the customer to the turn or the desired destination.

Once a customer reaches a desired destination along the route or reaches a next turn along the route, the wayfinding AR interface updates the visual cue for a next turn along the route or a next desired destination along the route. Still further, if a desired destination along the route is a desired item of a store, the video being viewed by the customer through the customer device is processed to detect the item within the video and highlight or provide a rendering of the item within the video, such that the customer can quickly identify the item within the physical environment of the customer, pick the item, and move to a next desired item or a next turn along the route.

As used herein, the terms "customer," "consumer," "user," "staff member," "employee," and/or "picker" may be used interchangeably and synonymously herein and below. This refers to an individual that is engaged in an AR wayfinding session with system 100.

The phrase "Augmented Reality (AR)" is intended to mean a blending of actual physical objects present within an environment of a user and artificially generated objects that are superimposed into the environment within a video as the video is captured in real time by a camera of a user-operated device as the user operates and travels with the device.

An "object" is intended to mean an electronically identified real-world structure (shelf, aisle, door, chair, terminal, desk, display, device, etc.) or a real-world item that is identified within the physical environment of the user from a video of the user-operated device for purposes of identification during an AR wayfinding session (e.g., a physical/real-world object). An object may also be an AR-rendering of a physical object or an AR rendering of a shape, symbol, text, graphic, and/or animation ("AR object") that is independently generated and provided within the video during the user's AR wayfinding session but that is not present within the physical environment of the user during the AR wayfinding session.

An "AR wayfinding session" refers to a communication session during which the user is provided a route or path to one or more items at a given location and AR-based wayfinding route guidance is provided to the user through the indoor location via an AR app of a user-operated device. An integrated camera of the user device captures real-time video being viewed by the user as the user travels the route through the indoor location to the item(s). One or more AR objects that dynamically change based on the user's tracked location along the route relative to a desired item or a turn along the route are blended into the video being viewed by the user as the user traverses the route to the item(s). Additionally, the user device can be instructed to provide a variety of haptic feedback as additional wayfinding guidance as the user travels through the indoor location and navigates the route to the item(s).

System 100 defines routes or walking paths through an indoor location to one or more items as a sequence of points. If a given retailer already has the ability to provide valid walking paths, such paths are converted into records comprising a sequence of nodes where each record is a valid walking path within a given store of the retailer. Typically, any existing walking path of a retailer is not a straight line (rather it is comprised of a series of turns), such that when a walking path is converted into the record, each turn associated with the existing walking path is identified as a node within the record and represented within the record as a collection of legs or segments that are straight lines between nodes.

When a user is engaged in an AR wayfinding session for a given indoor location, a route or path is provided to an AR app on the user device via a route manager. The path corresponds to a record associated with the path. As the user begins to walk the path, the location of the user is tracked relative to the current segment of the record for the path using an AR-based distance algorithm and AR-rendered objects are superimposed onto the video to provided real-time feedback through novel wayfinding guidance.

For example, a dynamically changing AR object (such as a three-dimensional (3D) arrow is superimposed into the video that the user is viewing while walking. The arrow points in the direction that the user is to walk for the current segment. A next node in the path for which the user is to turn is also rendered into the video as a second AR object (such as a sphere). The 3D arrow points to the sphere within the video being viewed by the user. The distance of the user to the next node is tracked using an AR algorithm to dynamically change attributes of the sphere and/or arrow within the video as the user travels closer to the next node. As an AR-tracked distance between the user and a next node decreases, the sphere is colored different variations of red providing real-time visual cues to the user that the user is walking in the correct direction towards the next node of the path. As tracked distance between the user and the next node increases, the sphere is colored different shades of blue providing real-time visual cues to the user that the user is walking away from or in the incorrect direction needed for the next node.

AR distance detection is used for dynamically changing the color of the sphere within the video being viewed by the user on the user device as the user moves through the indoor location. When the user is tracked to be within a predefined distance of the node, the 3D arrow changes and/or the sphere changes for the next node along the path and haptic feedback may be provided through the user device, such as vibrations indicating a turn is coming up or needed at this juncture along the path.

It is noted that the 3D arrow may also change colors to indicate the distance the user is from the sphere or the next node, the angle of the arrow can also change slowly as the user moves toward the next node to reflect the direction of the turn that is approaching at the next node using the user device's accelerometer; in this case, the sphere may or may not be used with the arrow as discussed above.

When a user reaches the next node, the next leg or segment of the path is pulled from the record and the process completes until the path is completely traversed. Further, as the user traverses the path and items are to be picked, the item to be picked can be detected on a shelf from the video and an AR-generated object or rendering of the item is presented within the video to the user to highlight the location of the item on the shelf.

Furthermore, a current distance of the user from a next node may be superimposed onto the video with the 3D arrow as the user walks toward the next node. Additionally, the size (another AR object attribute besides color) of the node can become smaller and larger as the user moves toward the next node.

Moreover, within a given segment of the path if an item is to be picked for that segment, the user's video can display the item along with its location below the video on the user device within the AR app. For example, a portion of the screen on the user device below the video may include item information for an item that is to be picked for the users current segment along the path, such as a text message with an image of the item stating that a specific brand of canned tomatoes is to be picked and is located in this segment at aisle X bin Y along with a quantity to pick is N.

It is within the above-noted context, that system 100 is now discussed in detail with FIG. 1.

System 100 comprises a cloud/server 110, a plurality of user-operated devices 120, and one or more retail servers 130.

Cloud/Server 110 comprises at least one processor 111 and a non-transitory computer-readable storage medium 112. Medium 112 comprises executable instructions for a route manager 113, a tracker 114, and an AR interface 115. The executable instructions when provided to and executed by processor 111 from medium 112 cause processor 111 to perform the processing discussed herein and below for route manager 113, tracker 114, and AR interface 115.

Each user-operated device 120 (hereinafter just "device 120") comprises at least one processor 121 and a non-transitory computer-readable storage medium 122. Medium 122 comprises executable instructions for an AR application (app) 123. The executable instructions when provided to and executed by processor 121 from medium 122 cause processor 121 to perform the processing discussed herein and below for AR app 123.

Each retail server 130 comprises at least one processor 131 and a non-transitory computer-readable storage medium 132. Medium 132 comprises executable instructions for a retail store services manager 133. The executable instructions when provided to and executed by processor 131 from medium 132 cause processor 131 to perform the processing discussed herein and below for optional retail store services manager 133.

Route manager 113 uses an API to interact with retail store services manager 133 to obtain a path for a given user (e.g., a customer, a store employee, an inventory stocker, a third-party picker) and one or more items associated with the path that the user desires to pick/stock from the store for an order. Route manager 113 converts the path into a record that comprises entries, each entry in the record associated with a straight-line segment and two nodes, and the record is associated with the user (such as through a mobile device identifier for the user device 120 and/or a user identifier for the user). The first node of the record is identified as an entry point into the retail area of the store (note for a store employee this may be a door that leads from any employee area into the retail area of the store, such that the entry point does not necessarily have to be an ingress point for customers).

Once the path, the associated items, and the user or order identifying information is obtained and converted into the record for the path, system 100 is ready for the user to being their trip/journey along the path. The trip along the path within the store can be initiated for the user in a variety of manners.

For example, a barcode or Quick Response (QR) code may be positioned at first nodes within the store that provide access to the retail area of the store, the user opens AR app 123 on device 120 and the integrated camera is activated and viewable through a screen of a user-facing interface of AR app 123. The user directs a focus of the camera to the barcode or QR code and AR app 123 sends a message to AR interface 115 with the barcode, a device identifier for device 120, and, optionally, a registered user identifier associated with the user. The message is provided to route manager 113 by interface 115. Route manager 113 decodes the barcode or QR code and identifies the retail store and the entry node into the retail store. Router manager 113 uses the device identifier and/or user identifier to identify the order and retrieve the record associated with the path and the items that are being picked/stocked for the order.

In another case, AR app 123 reports its location directly to route manager 113 when it detects that the device 120 is at the retail store. Router manager 113 uses the location of the device 120 and checks for any orders associated with the user identifier for the user registered to the device identifier for the device 120. Route manager 113 pulls the record.

It is noted that other approaches may be used as well for a record (path and items for a given retail store) to be associated with a user and/or a user device 120 and pulled for an AR waypoint session of system 100.

Once the user device 120 is identified at the first node of the retail area of the store and properly associated with an order defined in a record as a path through the store to pick/stock items of the store, interface 115 establishes and initiates an AR waypoint session with device 120 and AR app 123. AR interface 115 also initiates tracker 114.

Tracker 114 utilizes an AR-based distance and tracking algorithm similar to what is used in AR gaming that tracks user movements and corresponding movements of the user-device 120 utilizing settings and states associated with the device's camera, gyroscope, accelerometer, and analysis of the real-time video captured by the camera to calculate distances and directions of device movements within a physical environment of the user relative to a starting point for which distance and tracking was initiated on the device (the first node of the path for the user).

The record associated with the path for the AR waypoint session also comprises distances between each node or a distance for each segment. This allows tracker 114 to subtract the total distance between two given nodes based on the calculated distance that the user device 120 is tracked as having traveled by the AR-based distance and tracking algorithm. So, when the user begins the session at the first node (entry point into the retail area of the store) at the start of the AR waypoint session and begins to travel the known length of the first segment to the second node is obtained and as the device 120 moves a remaining length of the segment is calculated by subtracting the distance the device 120 traveled from the known length of the first segment. The remaining length of the segment and the direction of the device 120 are reported in real time to interface 115.

Interface 115 generates one or more AR objects, such as the 3D arrow discussed above and/or the sphere discussed above, and changes attributes of the AR object(s) based on the current direction of travel of device 120 and based on the remaining length of the current segment. For example, the size of the object(s) correlates to the remaining distance to the next node and the color of the object(s) correlates to the remaining distance to the next node. The current remaining distance to the next node may also be provided with the AR object(s) as a component of the AR object. For example, the 3D arrow may include a text string that indicates the current remaining distance to the next node is 2.5 meters (m). The text string may be viewed as an additional attribute of the AR object, which continuously changes as the user travels based on the tracker-provided distance to the next node. A variety of other information associated with a given entry of the record may also be provided by interface 115 for the current segment to AR app 123, such as an object that comprises an image and text of an item that is to be picked/stocked along the current segment. For example, an item object may comprise an image of a specific brand of product along with written text stating its specific aisle and bin number and the quantity that is to be picked.

In an embodiment, interface 115 also provides an AR object that visually depicts multiple segments for the path within a graphical rendering of a map for the store along with the current location of the user within the current segment. This AR object may be minimized to a small size and rendered with other AR objects within the video that the user is viewing while traversing the store.

Interface 115 provides the AR object(s) to AR app 123 which superimposes them into the video being viewed by the user through app 123 along with the physical environment of the store as the user travels the current segment. The AR object(s) is continuously being streamed and updated by interface 115 based on the remaining distance to the next node provided by tracker 114. Any object provided by the interface 115 that identifies an image of an item to pick/stock within a current segment is also rendered at a bottom of the screen separate from the video within app 123.

When tracker 114 determines that the user is within a configured distance of the next node, a notification is sent to interface 115. Interface 115 grabs the next segment from the record for the path, changes the AR object(s) and/or item objects, and sends a notification with the changes to app 123. App 123 upon receiving the changes causes a haptic response on device 120, such as vibrating the device and updates the AR object being blended with the video along with any provided item object.

The above-noted process is repeated for each entry in the record (each segment of the path) until the path is completely traversed by the user.

When the user is to pick/stock an item within a current segment, interface 115 inspects the video feed for the item and when recognized provides an AR item object for the item's location within the video to app 123. App 123 blends that into the video at the location for purposes of highlighting where the item is at on a shelf within a given aisle. The AR item object may be a mini rendering of an item image for the item or may be an arrow, a circle, or other shape indicator.

In an embodiment, the user device 120 is a phone, a tablet, or a wearable processing device, such as a watch, glasses, or goggles.

In an embodiment, route manager 113, tracker 114, and interface 115 are subsumed within retail server 130 for a specific retailer.

In an embodiment, cloud/server 110 further comprise an Application Programming Interface (API) to third-party picking services, such as Instacart®, a specific retailer's picking service (Walmart®, Kroger®, Amazon®, etc.), Shipt®, etc. The API allows a specific list of items for a given order or a given user (customer or picker) and a path through a given store to be obtained by router/tracker 114 for a given order or given user/customer.

In an embodiment, route manager 113, tracker 114, and interface 115 are subsumed within a third-party picking service server.

In an embodiment, AR app 123 is integrated into and subsumed into an existing third-party picking service's or retailer's mobile ordering application.

In an embodiment, the indoor location is associated with a retail store, a warehouse, a museum, or an entertainment/event venue.

Figure 2:
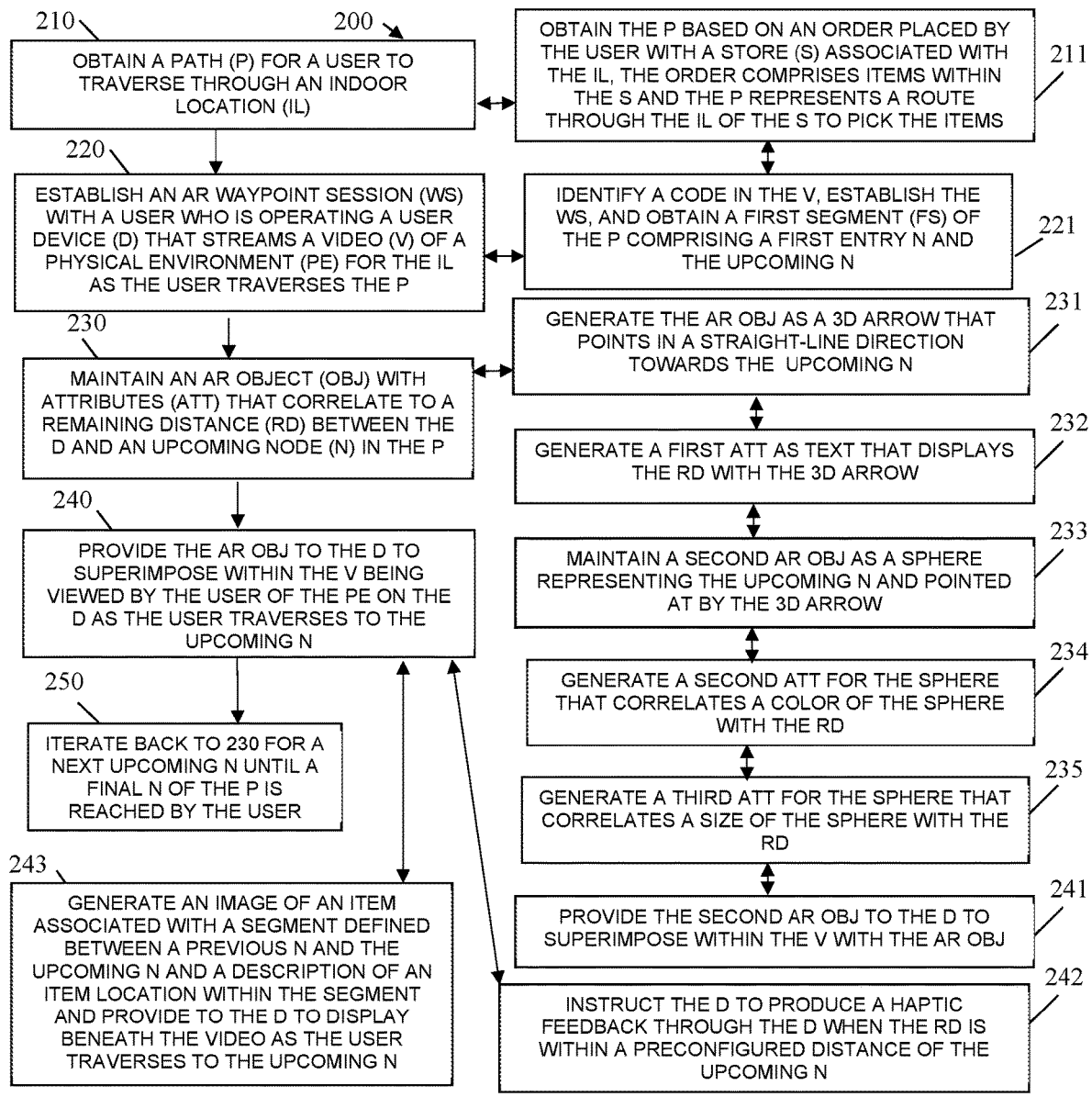
FIG. 2 is a diagram of a method for indoor wayfinding, according to an example embodiment.
Figure 3:
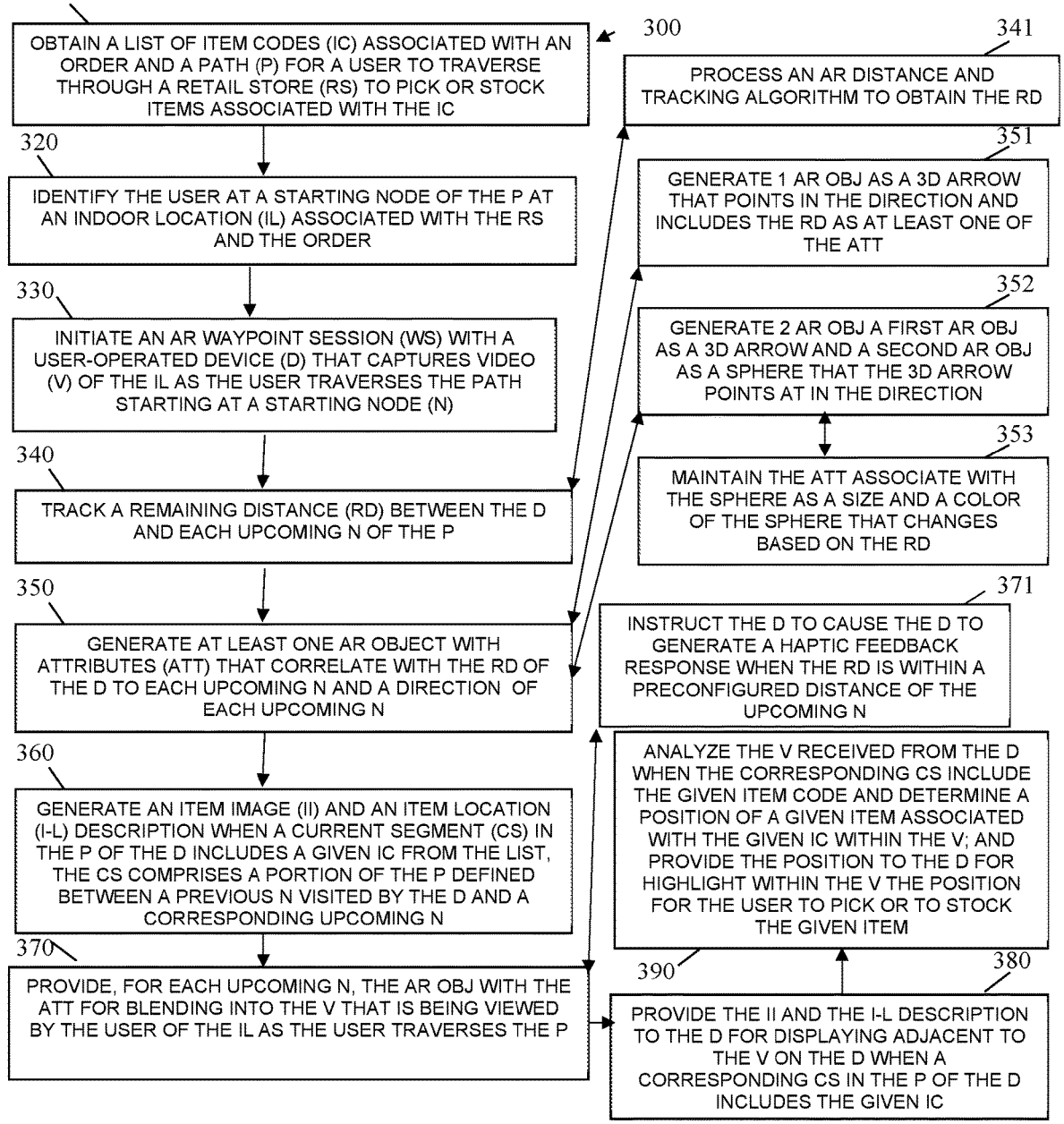
FIG. 3 is a diagram of another method for indoor wayfinding, according to an example embodiment.

The above-referenced embodiments and other embodiments are now discussed within FIGS. 2-3.

FIG. 2 is a diagram of a method 200 for indoor wayfinding, according to an example embodiment. The software module(s) that implements the method 200 is referred to as an "AR indoor wayfinder." The AR indoor wayfinder is implemented as executable instructions programmed and residing within memory and/or a non-transitory computer-readable (processor-readable) storage medium and executed by one or more processors of one or more devices. The processor(s) of the device that executes the AR indoor wayfinder are specifically configured and programmed to process the AR indoor wayfinder. The AR indoor wayfinder may have access to one or more network connections during its processing. The network connections can be wired, wireless, or a combination of wired and wireless.

In an embodiment, the device that executes the AR indoor wayfinder is cloud 110. Cloud 110 comprises a plurality of servers logically cooperating and accessible as a single server 110 (cloud 110).

In an embodiment, the device that executes the AR indoor wayfinder is a server 110 that is separate from any given retail server 120.

In an embodiment, the AR indoor wayfinder is all or some combination of 113, 114, and/or 115.

At 210, the AR indoor wayfinder obtains a path for a user to traverse through an indoor location. The manner in which the path is obtained can be achieved via any of the techniques recited above with the discussion of system 100. Also, in an embodiment, the path is obtained as a data structure that was generated as a result of an AR mapping session in which anchor objects are scanned via a user AR app at predefined distances beginning at a starting anchor point. Each anchor point a predefined distance, the data structure comprising a grid with grid cells corresponding to a physical distance of the anchor points.

In an embodiment, at 211, the AR indoor wayfinder obtains the path based on an order placed by a user with a store associated with the indoor location. The order comprises items within the store and the path represents a route through the indoor location of the store to pick the items or shelves and displays along the route.

At 220, the AR indoor wayfinder establishes an AR waypoint session with a user who is operating a user device 120 that stream a video of a physical environment for the indoor location as the user traverses (travels) the path.

In an embodiment of 211 and 220, at 221, the AR indoor wayfinder identifies a code in the video, establishes the AR waypoint session, and obtains a first segment of the path comprising a first entry node and an upcoming node.

At 230, the AR indoor wayfinder maintains an AR object with attributes that correlate to a tracked remaining distance between the user device and the upcoming node in the path.

In an embodiment of 221 and 230, at 231, the AR indoor wayfinder generates the AR object as a 3D arrow that points in a straight-line direction towards the upcoming node.

In an embodiment of 231 and at 232, the AR indoor wayfinder generates a first attribute as text that displays the remaining distance with the 3D arrow.

In an embodiment of 232 and at 233, the AR indoor wayfinder maintains a second AR object as a sphere representing the upcoming node and point at by the 3D arrow.

In an embodiment of 233 and at 234, the AR indoor wayfinder generates a second attribute for the sphere that correlates a color of the sphere with the remaining distance.

In an embodiment of 234 and at 235, the AR indoor wayfinder generates a third attribute for the sphere that correlates a size of the sphere with the remaining distance.

At 240, the AR indoor wayfinder provides the AR object with the attributes to the user device 120 to superimpose within the video being viewed by the user of the physical environment on device 120 as the user traverses (travels or moves) to the upcoming node.

In an embodiment of 234 and 240, at 241, the AR indoor wayfinder provides the second AR object with the corresponding attributes to the device 120 to superimpose within the video with the AR object and its attributes.

In an embodiment, at 242, the AR indoor wayfinder instructs the device 120 to produce a haptic feedback response through the device 120 and on the device 120 when the remaining distance is within a preconfigured distance of the upcoming node.

In an embodiment, at 243, the AR indoor wayfinder generates an image of an item associated with a segment defined between a previous node and the upcoming node and a description of an item location within the segment and provides to the device 120 to display beneath or adjacent to the video as the user traverses to the upcoming node.

At 250, the AR indoor wayfinder iterates back to 230 for a next upcoming node until a final node of the path is reached by the user.

FIG. 3 is a diagram of another method 300 for indoor wayfinding, according to an example embodiment. The software module(s) that implements the method 300 is referred to as an "AR indoor navigation interface." The AR indoor navigation interface is implemented as executable instructions programmed and residing within memory and/or a non-transitory computer-readable (processor-readable) storage medium and executed by one or more processors of a device. The processors that execute the AR indoor navigation interface are specifically configured and programmed for processing the AR indoor navigation interface. The AR indoor navigation interface may have access to one or more network connections during its processing. The network connections can be wired, wireless, or a combination of wired and wireless.

In an embodiment, the device that executes the AR indoor navigation interface is cloud 110. In an embodiment, the device that executes the AR indoor navigation interface is server 110.

In an embodiment, the AR indoor navigation interface is all of or some combination of 113, 114, 115, and/or method 200 of FIG. 2.

The AR indoor navigation interface presents another and, in some ways, enhanced processing perspective from that which was discussed above for cloud 110 and method 200.

At 310, the AR indoor navigation interface obtains a list of item codes (note the list may comprise a single item code) for a user to traverse (travel) through a retail store to pick or to stock the items (or item) associated with the item code (or item codes).

At 320, the AR indoor navigation interface identifies the user at a starting node of the path at the indoor location associated with the retail store and the order. This can be achieved via any of the mechanisms discussed above with system 100.

At 330, the AR indoor navigation interface initiates an AR waypoint session with a user-operated device 120 that captures a video of the indoor location as the user traverses the path starting at a starting or a first node of the path.

At 340, the AR indoor navigation interface tracks a remaining distance between the device 120 and each upcoming node of the path.

In an embodiment, at 341, the AR indoor navigation interface processes an AR distance, tracking, and/or mapping algorithm to obtain the remaining distance.

At 350, the AR indoor navigation interface generates at least one AR object with attributes that correlate with the remaining distance of the device 120 to each upcoming node and a direction of each upcoming node.

In an embodiment, at 351, the AR indoor navigation interface generates one AR object as a 3D arrow that points in the direction and includes the remaining distance as at least one of the attributes. Other attributes for the 3D arrow can include a size of the 3D arrow and a color of the 3D arrow that also correlate to and change with changes in the remaining distance as was discussed above with system 100.

In an embodiment, at 352, the AR indoor navigation interface generates two AR objects, a first AR object as a 3D arrow and a second AR object as a sphere that the 3D arrow points at in the direction.

In an embodiment of 352 and at 353, the AR indoor navigation interface maintains the attributes associated with the sphere as a size and a color of the sphere that changes based on values of the remaining distance. Other attributes associated with the 3D that correlate to value changes in the remaining distance may include text for the value changes, a size of the 3D arrow, and/or a color of the 3D arrow.

At 360, the AR indoor navigation interface generates an item image and an item location description when a current segment in the path of the device 120 includes a given item code from the list. The current segment comprises a portion of the path device 120 between a previous node visited by the device and a corresponding upcoming node that device 120 is traveling to.

At 370, the AR indoor navigation interface provides, for each upcoming node, the AR object with the corresponding attributes to device 120 for blending into the video that is being viewed by the user of the physical environment for the indoor location as the user traverses (travels) the path.

In an embodiment, at 371, the AR indoor navigation interface instructs the device 120 to cause the device 120 to generate a haptic feedback response when the remaining distance is within a preconfigured distance of the upcoming node.

At 380, the AR indoor navigation interface provides the item image and the item location description to the device 120 for displaying adjacent to the video on the device to the user when a corresponding current segment in the path of the device 120 includes the given item code.

In an embodiment, at 390, the AR indoor navigation interface analyzes the video received from or streamed from the device 120 when the corresponding current segment includes the given item code using image recognition on known features associated with a given item that is associated with the given item code. The AR indoor navigation interface determines a position of the given item within the video and the AR indoor navigation interface highlights within the video the position within the video for the user to pick or to stock the given item of the order.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    obtaining a path for a user to traverse through an indoor location;
    establishing an Augmented Reality (AR) waypoint session with the user who is operating a user device that streams a video of a physical environment for the indoor location as the user traverses the path;
    maintaining an AR object with attributes that correlate to a remaining distance between the user device and an upcoming node in the path;
    providing the AR object to the user device to superimpose within the video being viewed by the user of the physical environment on the user device as the user traverses to the upcoming node; and iterating back to the maintaining for a next upcoming node until a final node of the path is reached by the user.

2. The method of claim 1, wherein obtaining the path based on an order placed by the user with a retail store associated with the indoor location, wherein the order comprises a plurality of items located within the retail store and the path represents a route through the indoor location of the store for the user to pick the items.

3. The method of claim 2, wherein establishing further includes identifying a code in the video, establishing the AR waypoint session, and obtaining a first segment of the path comprising a first entry node and the upcoming node.

4. The method of claim 1, wherein maintaining further includes generating the AR object as a three-dimensional (3D) arrow that points in a straight-line direction towards the upcoming node.

5. The method of claim 4, wherein generating further includes generating a first attribute as text that displays the remaining distance with the 3D arrow.

6. The method of claim 5, wherein maintaining further includes maintaining a second AR object as a sphere representing the upcoming node and pointed at by the 3D arrow.

7. The method of claim 6, wherein maintaining the second AR object further includes generating a second attribute for the sphere that correlates a color of the sphere with the remaining distance.

8. The method of claim 7, wherein generating the second attribute further includes generating a third attribute of the sphere that correlates a size of the sphere with the remaining distance.

9. The method of claim 8, wherein providing the AR object further includes providing the second AR object to the user device to superimpose within the video with the AR object.

10. The method of claim 1, wherein providing further includes instructing the user device to produce a haptic feedback through the user device when the remaining distance is within a preconfigured distance of the upcoming node.

11. The method of claim 1, wherein providing further includes generating an image of an item associated with a segment defined between a previous node and the upcoming node of the path and a description of an item location within the segment and providing to the user device to display beneath the video as the user traverses to the upcoming node.

12. A method, comprising:
obtaining a list of item codes associated with an order and a path for a user to traverse through a retail store to pick or to stock the items associated with the item codes;
identifying the user at a starting node of the path at an indoor location associated with the retail store and the order;
initiating an Augmented Reality (AR) waypoint session with a user-operated device that captures video of the indoor location as the user traverses the path starting at the starting node;
tracking a remaining distance between the user device and each upcoming node of the path;
generating at least one AR object with attributes that correlate with the remaining distance of the user device to each upcoming node and a direction of each upcoming node;
generating an item image and item location description for each item code when a current segment in the path of the user device includes a given item code from the list, wherein the current segment comprises a portion of the path defined between a previous node visited by the user device and a corresponding upcoming node;
providing, for each upcoming node, the AR object with the attributes to the user device for blending into the video that is being viewed by the user of the indoor location as the user traverses the path; and
providing the item image and the item location description to the user device for displaying adjacent to the video on the user device when a corresponding current segment in the path of the user device includes the given item code.

13. The method of claim 12 further comprising:
analyzing the video received from the user device when the corresponding current segment includes the given item code and determining a position of a given item associated with the given item code within the video; and
providing the position to the user device for highlighting within the video the position for the user to pick or to stock the given item.

14. The method of claim 12, wherein tracking further includes processing an AR distance and tracking algorithm to obtain the remaining distance.

15. The method of claim 12, wherein generating the at least one AR object comprises generating one AR object as a three-dimensional (3D) arrow that points in the direction and includes the remaining distance as at least one of the attributes.

16. The method of claim 12, wherein generating further includes generating two AR objects a first AR object as a three-dimensional (3D) arrow and a second AR object as a sphere the 3D arrow points at in the direction.

17. The method of claim 16, wherein generating the two AR objects further includes maintaining the attributes associated with the sphere as a size and a color of the sphere that changes based on the remaining distance.

18. The method of claim 12, wherein providing for each upcoming node further includes instructing the user device to cause the user device to generate a haptic feedback response when the remaining distance is within a preconfigured distance of the corresponding upcoming node.

19. A system, comprising:
a cloud processing environment comprising at least one server;
the at least one server comprising a processor and a non-transitory computer-readable storage medium;
the non-transitory computer-readable storage medium comprises executable instructions; and
the executable instructions when executed on the processor from the non-transitory computer-readable storage medium cause the processor to perform operations comprising:
establishing one or more Augmented Reality (AR) waypoint sessions with user-operated devices that capture and provide videos as users traverse an indoor location;
generating at least one AR object with attributes that correlate to a remaining distance between a given user-operated device and each given upcoming node of a given path provided for a given user to pick items from the indoor location during a given AR waypoint session; and
providing the at least one AR object with the attributes for blending into the given video on the given user-operated device as the given user views the given video on the given user-operated device and traverses the path at the indoor location until a current node of the given path is a final node of the given path.

20. The system of claim 19, wherein the executable instructions further include additional executable instruction that further cause the processor to perform additional operations comprising:

provrding an item image and an item location description to the given user-operated device for each segment of the path that comprises a given item for the given user-operated device to display adjacent to the given video on the given user-operated device as the given user traverses the path until the current node is the final node.

* * * * *